UNITED STATES PATENT OFFICE.

OSWALD RICHTER AND FRIEDRICH PICK, OF VIENNA, AUSTRIA-HUNGARY.

PROCESS FOR THE DECORTICATION AND SCOURING OF URTICACEOUS PLANTS.

1,201,101.     Specification of Letters Patent.     Patented Oct. 10, 1916.

No Drawing.     Application filed February 2, 1915. Serial No. 5,804.

*To all whom it may concern:*

Be it known that we, Dr. OSWALD RICHTER, professor at the University of Vienna, and FRIEDRICH PICK, manufacturer, both subjects of the Emperor of Austria-Hungary, residing at Vienna, in the Empire of Austria-Hungary, have invented certain new and useful Improvements in the Process for the Decortication and Scouring of Urticaceous Plants, of which the following is a specification.

The object of the present invention is a process for separating and rendering proper for spinning the fibers contained in urticaceous plants, which process is characterized by this, that first the thin layers of pectin surrounding the fibers are destroyed, the then liberated fibers are subjected in a dry or wet condition to a hackling process, then boiled up to an hour in a bath of soap to induce a capacity for being spun, and finally broken and hackled again in a wet or dry condition. The removal of the layers of pectin may be effected in this application in various ways, either by treating the rind or bark drawn off from the dry or green plants with ammonia solution or by a retting or steeping process, or else even by a mechanical process.

The novelty of the process consists on the one hand in the combined successive application of the processes designated, and also in this that the processes used for removing the layers of pectin differ very essentially from the treatment hitherto known with alkalis and from the known retting processes. In regard to the alkali treatment this differentiating feature lies in the fact, that the ammonia solution is employed at a normal temperature only slightly raised, so as to avoid any injury to the fibers by heat or pressure.

The retting process used for removing the layers of pectin according to the invention differs from the known equivalent processes in this, that it is preceded by a leaching process for removing the 7 to 8% of fruit sugar contained, so that the retting process takes place only after the removal of the sugar by leaching. The effect of the removal of the sugar will be discussed later on; at this point we merely emphasize, that both the fact, that the *Urticaceæ* exhibit so large a quantity of fruit sugar, as also the fact, that the sugar must be removed in the interest of the smooth working of the retting process before the same is started, were not known up to the present time.

In what follows there will first be described the modification of the process used according to the invention for destroying the layers of pectin.

The destruction of the pectin substance may be effected in three ways, that is, chemical, biological or mechanical: The raw material forming the basis for all these processes is the rind or bark pulled off from the nettle plant (*Urtica*), which can be drawn off not only from the green plant, but, as the applicants' experiments have shown, also from the dry plants, if the latter have previously been softened up in ordinary water from ½ to 2 hours.

According to the chemical process the rind drawn off from the green or dried and steeped nettle plant is macerated at about 30–40° C. in an ammonia solution and subjected to a hackling process in a dry or moist condition. The duration of the maceration depends on the concentration of the ammonia solution and rises from 8 to 72 hours, accordingly as the solution is used, concentrated at 25–27% or diluted, 5–6%. For economical reasons the removal of the sugar from the rind is effected by steeping for two to ten hours in hydrant water at 10–15° C. although the process of maceration goes on smoothly without this.

The removal of the pectin substance in a biological way is effected by the action of bacteria in the form of a retting process. As the bacteria arising in the retting process along with the pectin ferments, and also the bacteria destroying the fiber substance, are extraordinarily assisted in their development by the sugar and thereby hinder the development of those bacteria, which attack the pectin substance, therefore in carrying out this process it is absolutely necessary, before beginning the retting process to free the rind from its sugar content, which can be accomplished by leaching the same in water from two to five hours at a temperature of 10–15° C. For carrying out the retting process, the rind substance taken out of the water after leaching is subjected to the retting process for 24 to 72 hours, which effects the complete destruction of the pectin substance. The retted rind is subjected in a moist or dry condition to a breaking or hackling process. The duration of the retting process depends in the known way on the temperature, at which the process takes place. However it is also possible to destroy the pectin layers simply by mechanical action, in which it is particularly necessary previously to leach out the sugar from the rind. This mechanical process consists in this, that the rind obtained after leaching out the sugar is either hackled directly in a still moist condition or after drying is first subjected to a breaking process and then to the hackling.

All three processes give a fiber, free from pectin, but crude and possessing little flexibility. In order to transform the fiber so obtained free from pectin into a form capable of spinning, the product is boiled in a soap bath from one to 4/4 hours and immediately after the soap bath in the still moist condition or after previous drying is repeated hackled and broken for obtaining a fiber entirely capable of being spun.

Claim:

The process of producing spinnable fibers from the rind of nettle plants, which consists in removing the rind in either dry or green state, macerating the same in an ammonia solution heated to a temperature of from 30 to 40° C., then subjecting the liberated fibers in either of a dry or wet state to a hackling operation, subsequently boiling the fibers in a soap bath for approximately an hour, and finally breaking the fibers and subjecting them to a repeated hackling operation in either of a dry or wet state.

In testimony whereof we affix our signatures in the presence of two witnesses.

Dr. OSWALD RICHTER.
FRIEDRICH PICK.

Witnesses:
 FRIEDRICH BINDER,
 AUGUST FUGGER.